United States Patent [19]
Lu

[11] Patent Number: 5,591,527
[45] Date of Patent: Jan. 7, 1997

[54] OPTICAL SECURITY ARTICLES AND METHODS FOR MAKING SAME

[75] Inventor: Shih-Lai Lu, Taipei, Taiwan

[73] Assignee: Minnesota Mining and Manufacturing Company, St. Paul, Minn.

[21] Appl. No.: 333,276

[22] Filed: Nov. 2, 1994

[51] Int. Cl.$^6$ .................................................. B32B 9/04
[52] U.S. Cl. .................. 428/411.1; 428/174; 428/187; 428/195; 428/198; 428/201; 428/304.4; 428/913; 283/72
[58] Field of Search ........................ 428/411.1, 261, 428/195, 343, 345, 352, 192, 198, 488.4, 914, 916, 174, 187, 913, 201; 283/1 CC, 72; 427/195

[56] References Cited

U.S. PATENT DOCUMENTS

| | | |
|---|---|---|
| Re. 24,906 | 12/1960 | Ulrich . |
| 3,594,865 | 7/1971 | Erb . |
| 4,025,673 | 5/1977 | Reinnagel ........................ 428/29 |
| 4,082,873 | 4/1978 | Williams . |
| 4,121,003 | 10/1978 | Williams . |
| 4,183,554 | 1/1980 | Howard, Jr. . |
| 4,184,701 | 1/1980 | Franklin et al. . |
| 4,202,957 | 5/1980 | Bonk et al. . |
| 4,315,665 | 2/1982 | Haines . |
| 4,417,784 | 11/1983 | Knop et al. . |
| 4,501,439 | 2/1985 | Antes . |
| 4,536,016 | 8/1985 | Solomon et al. . |
| 4,576,439 | 3/1986 | Gale et al. . |
| 4,576,850 | 3/1986 | Martens . |
| 4,630,891 | 12/1986 | Li . |
| 4,646,301 | 2/1987 | Orensteen . |
| 4,652,274 | 3/1987 | Bloecher et al. . |
| 4,691,993 | 9/1987 | Porter et al. . |
| 4,714,656 | 12/1987 | Bradshaw et al. . |
| 4,735,632 | 5/1988 | Oxman et al. . |
| 4,751,138 | 6/1988 | Tumey et al. . |

(List continued on next page.)

FOREIGN PATENT DOCUMENTS

| | | |
|---|---|---|
| 109581A2 | 5/1984 | European Pat. Off. . |
| 306161A2 | 3/1989 | European Pat. Off. . |
| 306162A2 | 3/1989 | European Pat. Off. . |
| 0323108 | 7/1989 | European Pat. Off. ........ B42D 15/02 |
| 0328086 | 8/1989 | European Pat. Off. ........ G06K 19/06 |
| 0354699A2 | 2/1990 | European Pat. Off. . |
| 4236563 | 5/1994 | Germany ....................... G03C 5/08 |
| 4316895 | 11/1992 | Japan . |
| 2212445 | 9/1991 | United Kingdom . |
| WO83/00653 | 3/1993 | WIPO . |
| WO94/13492 | 6/1994 | WIPO ............................ B42D 15/00 |

OTHER PUBLICATIONS

Radiation–Cure Inks, Encyclopedia of Chemical Technology (3rd Edition) 1981, vol 13, pp. 385–386.

Polyolefin & Ethylene Copolymer–Based Hot Melt Adhesives by Eastman & Fullhar Jr., Handbook of Adhesives (3rd Edition) 1990 Chapter 23, pp. 408–422.

Polyester and Polyamide High Performance Hot Melt Adhesives by Rossitto, Handbook of Adhesives (3rd Edition) 1990 Chapter 28, pp. 478–498.

Diffraction Grating, Edmond Scientific Co. p. 124, 1991.

*Primary Examiner*—William A. Krynski
*Attorney, Agent, or Firm*—Gary L. Griswold; Walter N. Kirn; Peter L. Olson

[57] ABSTRACT

Optical security articles and methods of making same are described comprising a first layer substantially transparent to visible light and having a first refractive index, the first layer having a relief pattern on a first surface thereof and a substantially smooth second surface, and an adhesive layer coterminating with the first layer. The adhesive layer substantially completely fills and makes contact with a first portion of the plurality of geometric concavities, the adhesive layer having a second refractive index which is substantially similar to the first refractive index of the first layer. A second portion of the plurality of geometric concavities are precluded from contact with the adhesive layer by a corresponding plurality of separation layers, each separation layer having a separation layer refractive index which is different from the refractive index of the first layer.

16 Claims, 4 Drawing Sheets

U.S. PATENT DOCUMENTS

| | | |
|---|---|---|
| 4,805,984 | 2/1989 | Cobb, Jr. . |
| 4,856,857 | 8/1989 | Takeuchi et al. . |
| 4,892,385 | 1/1990 | Webster, Jr. et al. . |
| 4,895,428 | 1/1990 | Nelson et al. . |
| 4,903,440 | 2/1990 | Larson et al. . |
| 4,906,070 | 3/1990 | Cobb, Jr. . |
| 4,921,319 | 5/1990 | Mallik . |
| 4,933,120 | 6/1990 | D'Amato et al. . |
| 4,933,373 | 6/1990 | Moren . |
| 4,959,265 | 9/1990 | Wood et al. . |
| 4,968,063 | 11/1990 | McConville et al. . |
| 4,971,646 | 11/1990 | Schell . |
| 4,977,003 | 12/1990 | Brown et al. . |
| 4,984,824 | 1/1991 | Antes et al. . |
| 5,011,707 | 4/1991 | Schell et al. . |
| 5,042,842 | 8/1991 | Green et al. . |
| 5,056,892 | 10/1991 | Cobb, Jr. . |
| 5,060,981 | 10/1991 | Fossum et al. . |
| 5,077,870 | 1/1992 | Melbye et al. . |
| 5,085,514 | 2/1992 | Mallik et al. . |
| 5,095,415 | 3/1992 | Anderson et al. . |
| 5,106,125 | 3/1992 | Antes . |
| 5,169,707 | 12/1992 | Faykish et al. . |
| 5,175,030 | 12/1992 | Lu et al. . |
| 5,183,597 | 2/1993 | Lu . |
| 5,254,390 | 10/1993 | Lu . |

OPTICAL SECURITY ARTICLES AND METHODS FOR MAKING SAME

BACKGROUND OF THE INVENTION

1. Field of the Invention

The invention concerns novel optical security articles which can be used as transparent overlays to protect documents from tampering. The invention also concerns methods for making such articles.

2. Related Art

Documents often have adherent transparent overlays to provide protection against dirt, moisture, and general wear and tear. A typical protective transparent overlay has a plastic film bearing an aggressive adhesive layer by which it can be permanently adhered to the face of a document. Transparent overlays are known which do not obscure underlying information, such as those having legend-containing sheet materials which have retroreflective legend and retroreflective background areas that are substantially indistinguishable under ordinary diffuse light viewing conditions but are clearly distinguishable under retroreflective viewing conditions. Attempts to tamper with information over which the overlay has been applied result in readily detectable disruption of the overlay.

Other transparent overlays can be imaged with a pattern or legend, such as a holographic pattern or image that is readily noticeable only when viewed retroreflectively, and can be adhesively bonded to a document without obscuring the face of the document. Both reflecting and transparent hologram overlays are known. Holographic overlays, however, suffer from the problem that the hologram surface relief pattern is typically produced using a pattern of light interference fringes formed by the intersection of two coherent light beams, typically laser beams, which requires expensive lasers and other equipment. It would be advantageous if a transparent overlay could be developed which would avoid the use of holograms.

Shaped plastic articles, including substantially totally internal reflective films, have been made by replicating a microstructure-bearing surface with an ultraviolet radiation-curable organic oligomeric composition; however, their use as protective and/or security overlays for important documents and other articles is not known or suggested.

SUMMARY OF THE INVENTION

In accordance with the present invention, optical security articles are presented which can be used, for example, as protective transparent overlays for authenticated substrates such as documents, identification cards, and the like. The inventive articles can include an image, such as a design or logo, to enhance the authenticity of the substrate and also provide high tamper-resistance. Typically and preferably, the image is viewable only across a narrow range of viewing angles and is viewable in ambient (diffuse) light, thus affording a readily apparent verification of the authenticity of the substrate. The invention also provides methods for making such optical security articles.

One aspect of the invention is an optical security article comprising:

a) a first layer substantially transparent to visible light and having a first refractive index, the first layer having a structured first surface and a substantially smooth second surface, the structured first surface comprising a plurality of geometric concavities and corresponding peaks; and b) an adhesive layer coterminating with the first layer, the adhesive layer substantially completely filling and making adhesive contact with a first portion of the plurality of geometric concavities, the adhesive layer having a second refractive index which is substantially similar to the first refractive index of the first layer, thus forming at least one transparent area, wherein a second portion of the plurality of geometric concavities are precluded from contact with the adhesive layer by a separation layer disposed between the second portion of the plurality of geometric concavities and the adhesive layer. Preferably, the separation layer contacts only the peaks of the structured first surface and has a separation layer refractive index which is different from the first refractive index, although these conditions are not necessary to produce the desired optical reflection back through the first layer. Preferably, there are a plurality of areas having non-overlapping separation layers (i.e. all substantially in the same plane approximately parallel to the substrate to be protected), each of the separation layers having the same or very similar refractive index, and thus a plurality of transparent areas. The second portion of the plurality of geometric concavities and the separation layer thus define at least one reflective area.

As used herein the phrase "geometric concavity" means a concavity defined by shaped protrusions which have at least two planar facets, such as prisms, pyramidal protrusions, cube-corner protrusions, and the like. The phrase does not include concavities defined by protrusions which do not include planar facets, such as protrusions present in holographic films. The term "transparent" means transmitting at least 90% of incident light in the visible spectrum (about 400–700 nanometers wave length), as determined by a standard spectrophotometer. In preferred embodiments the plurality of geometric concavities are defined by a series of parallel linear prisms having planar facets (the facets of the linear prisms are either symmetrical or asymmetrical), such as in a substantially totally internal reflecting film. "Substantially totally internal reflecting" means that the film has a T-Test Value of 5% or less, wherein the T-Test is further explained herein. Another preferred embodiment is that wherein the plurality of geometric concavities of the first layer of the article comprises a diffraction grating. Another preferred embodiment is that wherein the plurality of geometric concavities of the first layer are defined by cube-corner structures, thus making the article retroreflective when viewed under retroreflective viewing conditions.

The first layer preferably comprises an organic polymeric material selected from the group consisting of free radical addition-polymerized polymers and thermoplastic materials, particularly preferably a free radical addition-polymerized polymer.

In preferred articles in accordance with the invention, the adhesive layer comprises a hot melt (thermoplastic) adhesive or a pressure-sensitive adhesive. A surface of the adhesive layer opposite the plurality of geometric concavities of the first layer may have a second layer removably adhered thereto, such as a release liner.

The plurality of separation layers preferably comprise an imaging material which may be colored or colorless. One preferred imaging material is an acrylic ink.

Another aspect of the invention comprises a tamper-proof article comprising the inventive optical security article secured by the adhesive layer to a substrate to protect the substrate from tampering and/or to enhance the appearance of authenticity of the substrate. The substrate may be essentially any substrate such as metal, wood, paper, plastic, ceramic, but is typically a photograph of an ID card or drivers license, a bank note, a stock certificate, or the like.

If the separation layer is an imaging material, such as an ink imprint of a logo, the logo is prominent when the tamper-proof article is viewed at the correct orientation, coming to the foreground over the underlying substrate. When the tamper-proof article is reoriented, the logo disappears and the underlying substrate is clearly visible. If an attempt is made to remove the optical security article, the continuous adhesive layer containing the validating logo is at least partially destroyed.

Methods of making the optical security articles and tamper-proof articles of the invention are also described herein.

A first method for making an optical security article of the invention comprises the steps of:

a) preparing a coatable composition comprising a curable organic resin;

b) providing a production tool comprising a first plurality of geometric concavities and corresponding peaks;

c) coating the coatable composition onto the production tool, thus substantially filling the first plurality of concavities;

d) contacting a first plastic film with the coatable composition on the production tool, at least one of the production tool and the first plastic film being flexible;

e) exposing the composition to conditions sufficient to cure the resin of the composition to yield a first intermediate comprising the first plastic film and a cured composition, the cured composition having a first refractive index;

f) removing the first intermediate from the production tool, the first intermediate having a structured first surface and a substantially smooth second surface, the structured first surface comprising a second plurality of geometric concavities and corresponding peaks which are the reverse image of the first plurality of geometric concavities and corresponding peaks;

g) providing a second plastic film having first and second surfaces;

h) applying a separation material on a selected area of the first surface of the second plastic film to form a second intermediate; and i) adhering the second intermediate to the first intermediate with an adhesive layer, the adhesive layer having a second refractive index which is substantially similar to the first refractive index of the cured composition, such that the separation material is disposed between a first portion of the second plurality of geometric concavities and a first portion of the adhesive layer to form a reflective area, and wherein a second portion of the adhesive layer adhesively contacts and fills a second portion of the second plurality of concavities to form a transparent area.

A method of making a tamper-proof substrate comprises the further steps of:

j) removing the second plastic film from the optical security article, thereby exposing the adhesive layer; and k) adhering the optical security article to a substrate employing the adhesive layer.

Alternatively, the first inventive methods just described may be modified in that the coatable composition may be applied first to the first plastic film, and then the coated film contacted with the production tool, this modification being the second inventive method.

A third inventive method for making an optical security article of the invention method comprises:

a) preparing a coatable composition comprising a curable organic resin;

b) providing a production tool comprising a first plurality of geometric concavities and corresponding peaks;

c) coating the coatable composition onto the production tool, thus substantially filling the first plurality of geometric concavities;

d) contacting a first plastic film with the coatable composition on the production tool, at least one of the production tool and the first plastic film being flexible;

e) exposing the composition to conditions sufficient to cure the resin of the composition to yield a first intermediate of the first plastic film and a cured composition, the cured composition having a first refractive index;

f) removing the first intermediate from the production tool, the first intermediate having a structured first surface and a substantially smooth second surface, the structured first surface comprising a second plurality of geometric concavities and corresponding peaks which are the reverse image of the first plurality of geometric concavities and corresponding peaks;

g) providing an adhesive layer, the adhesive layer having a second refractive index which is substantially similar to the first refractive index of the cured composition, the adhesive layer having first and second surfaces;

h) applying a separation material on a selected area of the first surface of the adhesive layer to form a second intermediate; and i) adhering the second intermediate to the first intermediate such that the separation material is disposed between a first portion of the second plurality of geometric concavities and a first portion of the adhesive layer to form a reflective area, and wherein a second portion of the adhesive layer adhesively contacts and fills a second portion of the plurality of geometric concavities to form a transparent area.

The third inventive method may be modified in the same manner as the first inventive method, thus producing the fourth inventive method.

The inventive optical security articles provided herein thus comprise a first transparent optical layer having a first refractive index $RI_1$ and having a smooth surface and a structured surface which bears a microstructure having a plurality of optically utilitarian geometric concavities, the smooth surface being adapted to receive incident light and having a light-transmitting area and a light-reflecting area. A second transparent layer, having a second refractive index $RI_2$, is secured to the structured surface of the first layer and contacts and bonds to the discontinuities in the light-transmitting area. The second refractive index $RI_2$ is substantially similar (preferably identical) to the first refractive index $RI_1$. A separation layer is disposed between the first transparent optical layer and the second transparent layer in the light-reflecting area such that the second transparent layer does not contact the geometric concavities, thus defining the light-reflecting area due to air gaps between the separation layer and the second transparent layer.

Further understanding of the invention will become apparent from reviewing the brief description of the drawing figures and description of preferred embodiments which follow.

These figures, which are idealized, are not to scale and are intended to be merely illustrative and nonlimiting.

DESCRIPTION OF PREFERRED EMBODIMENTS

I. Optical Security Articles

A. Reflecting Layer

Figure 1:
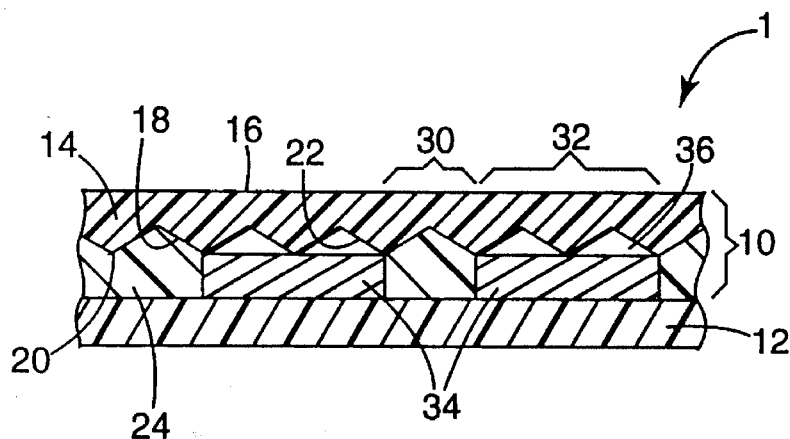
FIGS. 1–3 are cross sectional views through three embodiments of optical security articles of the invention secured to a substrate.

Referring to FIG. 1, an authenticated article embodiment 1 is illustrated, having an optical security article 10 secured to a substrate 12 such as a bank note, credit card, drivers license, personal identification card, stock certificate, and the like, article 10 functioning to protect substrate 12 from tampering and perhaps provide a more authentic appearance.

Article 10 comprises a first transparent, preferably continuous layer 14 which is typically and preferably a thin, flexible polymeric film and comprises a substantially smooth surface 16 and a structured surface 18, structured surface 18 bearing a plurality of optically utilitarian geometric concavities and peaks, the geometric concavities and peaks preferably defined by parallel prisms having planar faces or facets. Article 10 is typically and preferably retroreflective in the sense that incident light striking smooth surface 16, within certain angular ranges, will be substantially totally internally reflected at structured surface 18 in at least some areas of article 10. When structured surface 18 is a plurality of parallel linear prisms and the angle between facets is 90°, light incident upon smooth surface 16 will be totally internally reflected when the incident light is refracted by smooth surface 16 and then strikes the facets of structured surface 18 at an angle, with respect to the normal of the facet, which is greater than a critical angle. The critical angle, in air, is defined as the arc sine of the reciprocal of the index of refraction of the material. In addition, a significant portion of the incident light striking smooth surface 16 which produces refracted light which strikes structured surface 18 at angles less than the critical angle will be transmitted through first layer 14 and the remainder of the incident light will be reflected by smooth surface 16. Irrespective of the entrance angle of the incident light relative to smooth surface 16, there is negligible absorption of light by first layer 14.

In the preferred first embodiment 1 illustrated in FIG. 1, first layer 14 comprises a substantially totally internal reflecting film (sometimes referred to as an optical lighting film) of the type disclosed in U.S. Pat. No. 4,906,070 (Cobb, Jr.), the disclosure of which is incorporated herein by reference. "Substantially totally internal reflecting" pertains to the optical quality of the film. The optical quality of totally internal reflecting films ("TIRF") can be evaluated as follows. The optical quality of a TIRF can be evaluated with apparatus including a laser (Spectra-Physics Inc. Model 117A) with a spatial filter, a beam expander, and a collimator. Two diaphragms or irises are placed 18 and 38 cm from the laser and aligned therewith, and an annular sample holder with an opening 6.35 cm in diameter is placed 84 cm from the laser. Directly behind the sample holder is an integrating sphere (with a 3 cm diameter aperture) and a LAB SPHERE ML-400 radiometer. Using the diaphragms or irises, the laser is focused through the aperture to obtain a clean circle of light of about 3 mm diameter on a black surface mounted on the sample holder. A source intensity measurement of 100% is taken with no sample in place. The TIRF to be tested is then mounted on the sample holder with its flat surface facing the laser and its grooves extending vertically. Unless otherwise reported, T-Test Values are measured at ambient temperature. Readings are then made at from 12 to 15 different points on the TIRF within a 5 cm diameter area while making sure that none of the light strikes the frame of the sample holder. The readings are averaged and multiplied by 100 to give percent transmission which is the T-Test Value of the TIRF sample. T-Test Value is a criterion of the fidelity of replication of the TIRF. Smaller T-Test Value percentages indicate better fidelity of replication than larger percentages, and a T-Test Value of 5% or less indicates that the film is substantially totally internal reflecting.

In U.S. Pat. No. 5,183,597, plastic articles having microstructured surfaces are discussed, such as retroreflective cube-corner sheeting, Fresnel lenses, totally internal reflecting films, information carrying discs, and the like. A distinction is drawn between microstructured surfaces having a fine microstructure (diffraction gratings, video master discs) and those having relatively large or "coarse" microstructure (wherein the microstructured surface contains a plurality of optically utilitarian discontinuities ranging in depth from at least 0.025 mm to as great as about 0.5 mm). For the purposes of the present invention, the optical qualities of both fine and large microstructured cube-corner and prismatic films are useful.

When using a two dimensional array of parallel linear prisms, prism prove depth and pitch (distance between peaks) may be adjusted to achieve the desired balance between resolution of the image (preferably a logo or other indicia formed preferably via an acrylic ink) and the allowance of the adhesive to adequately fill the desired portion of grooves to produce transparent areas. The lower limit in prism size (groove depth) and pitch is determined by diffraction (a pitch of about 0.5 micrometer results in a diffraction grating); however, smaller prism depth and pitch increase resolution of the logo. For greatest logo resolution, a depth of 2 micrometers or less is preferred. The upper limit of prism groove depth and pitch is determined by the ability of the adhesive to adequately flow into the grooves. When a two dimensional array of parallel prisms is used, individual prisms may have either the same or different facet sizes, pitch and angles between facets. Preferably, the size of each prism is the same, and the facets all make an angle with the normal to smooth surface 16 of approximately 45° and angle between facets of 90°. By choosing the prism shape (i.e. by selecting the facet sizes), the verification angle can be adjusted.

Referring again to FIG. 1, structured surface 18 of first layer 14 preferably comprises a linear array of a plurality of miniature, substantially right angled isosceles prisms arranged side-by-side in parallel relationship to form a plurality of peaks 20 and grooves 22. The substantially perpendicular, planar facets of the prisms in this embodiment preferably make an angle of approximately 45° with smooth surface 16 when smooth surface 16 is maintained in a planar position, and 90° between facets.

First layer 14 is secured to substrate 12 through a second transparent adhesive layer 24 which is secured to structured surface 18 of first layer 14 and adhesively contacts and fills a first portion of the geometric concavities in a plurality of transparent areas 30, second layer 24 having a refractive index $RI_2$ which is substantially similar (preferably identical) to the refractive index $RI_1$ of first layer 14. Preferably the ratio of $RI_1:RI_2$ preferably ranges from about 0.9:1.0 to about 1.1:1.0, more preferably from about 0.97:1.0 to about 1.03:1.0, and is particularly preferably 1.0:1.0. For example, if polycarbonate were used as first layer 14 ($RI_1$=1.58) then adhesive layer 24 would preferably be an ethylene vinyl acetate adhesive ($RI_2$=1.54). Transparent areas 30 are denoted as such because incident light striking front surface 16 in these areas is substantially completely transmitted through the inventive optical security article to underlying substrate 12. The remaining area or areas of the inventive article are denoted as reflective areas 32, reflective areas 32 being described in further detail below.

In reflective area or areas 32 of article 10, a plurality of separation layers 34 are disposed between a second portion of geometric concavities (in the case of embodiment 1, grooves) of structured surface 18 and second transparent adhesive layer 24. Since second transparent adhesive layer 24 does not contact the geometric concavities in reflective areas 32 because of separation layers 34, pockets of air 36 are formed between the second portion of concavities and the separation layers 34, forming reflective areas 32. Thus, an air interface is provided along the surfaces of the geometric concavities in reflective areas 32. It should be understood that the terms "air", "air pockets" and "air interface" as used herein are general terms and reflect preferred embodiments only. The environment in which the optical security articles of the invention are produced will determine generally whether pockets of air, nitrogen, or some other fluid (gas or liquid) are formed.

As alluded to previously, there is at least one and typically a plurality of the reflective areas 32 in the inventive articles. These areas are denoted as being reflective because incident light striking front surface 16 of article 10 in reflective areas 32 at an appropriate angle of incidence is substantially retroreflected as described above. Air pockets 36 along the surfaces of the geometric concavities are needed for retroreflection to occur in reflective areas 32. Air in air pockets 36 provides for a significant change in refractive index along the surfaces of the second portion of geometric concavities in reflective areas 32. The change in refractive index should be at least 0.1 RI units, more preferably at least 0.7 RI units. Conversely, as described above, in transparent areas 30, there is substantially no change in refractive index along the surfaces of the first portion of geometric concavities. Thus, in transparent areas 30, light is transmitted through first layer 14 and through second layer 24 to underlying substrate 12.

Figure 2:
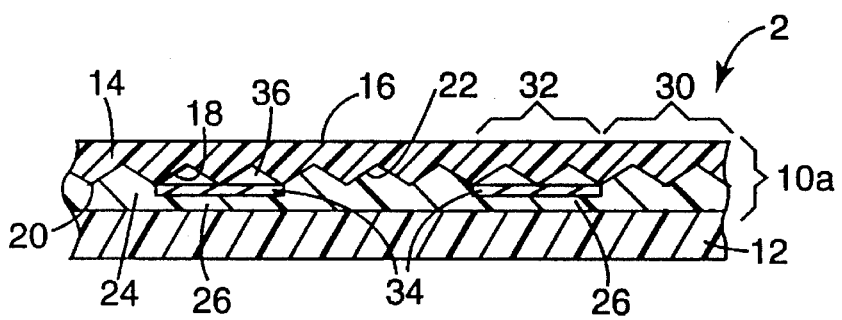

Referring to FIG. 2, tamper-proof article embodiment 2 is illustrated in cross-section. Embodiment 2 of FIG. 2 is similar to embodiment 1 of FIG. 1 except that optical security article 10a is formed via a different process and thus has a slightly different construction (the processes of production are described herein below). Separation layers 34 extend only a portion of the distance between structured surface 18 and substrate 12. This does not change the function of separation layers 34, however, in preventing flow of adhesive 26 into a second portion of geometric concavities to form air pockets 36, thus producing a plurality of reflective areas 32 and a plurality of transparent areas 30.

First layer 14 preferably comprises a polymeric material selected from the group consisting of addition polymerized resins (actinic or particle radiation-cured), and embossed thermoplastic materials. The structured surface of first layer 14 is most preferably formed using an addition polymerizable resin, more preferably an ultraviolet or visible radiation-curable resin, due to the ability to optimize curing conditions and photoinitiators for these resins used in their production. First layer 14 preferably comprises a composite plastic article characterized by a flexible or rigid plastic support layer, preferably a plastic film, one surface of which bears microstructure defining structured surface 18, such as parallel prisms or cube-corners. The microstructure is formed with the use of a coatable composition comprising an addition polymerizable and crosslinkable resin and a production tool or master, as described herein below.

Useful and preferred materials for plastic films onto which may be applied the microstructure include polyester, such as polyethylene terephthalate; polyamide; polycarbonate; poly(vinylchloride); poly(vinylidenechloride); cellulose acetate butyrate; cellulose acetate propionate; poly(ether sulfone), poly(methylmethacrylate), polyurethane, and the like.

Polycarbonate is one preferred plastic film material because it is economical, optically clear, and has good tensile strength. When its thickness is about 0.1 to about 1.2 mm, its has sufficient strength and flexibility to permit it to move a bead of the coatable composition across a rigid master negative molding surface, as described in U.S. Pat. No. 5,183,597, incorporated by reference herein.

Another preferred plastic film onto which the microstructure may be applied is the polyethylene terephthalate film known under the trade designation DSCT-PET, from Douglas Hanson Co., having a thickness of 0.127 mm. The plastic film thickness used in first layer 14 may range from about 0.1 mm up to about 10 mm.

The viscosity of the coatable compositions useful in producing the structured surface 18 of the articles of the invention is an important consideration, as alluded to briefly previously. If the viscosity of the coatable composition is too high, the composition will not flow adequately into the geometric concavities where and when desired. If the viscosity is too low, filling of the concavities is accomplished more efficiently, but the resins tend to shrink more upon curing.

The viscosity of the coatable composition preferably ranges from about 1000 to about 5000 centipoise (cps) (measured using a Brookfield viscometer, #3 spindle, at 30 rpm, at 25° C.). Above that range, air bubbles may be entrapped in the composition, and the composition may not completely fill the concavities of the master. If an attempt were made to obtain a viscosity below that range, the overall equivalent weight (weight per number of reactive groups) of the addition polymerizable resin of the coatable composition would be so low that the resin would experience shrinkage upon curing to such an extent that the cured resin would not faithfully replicate the master molding surface. Preferably the viscosity of the resin ranges from 2,000 to 3,000 cps. Within that preferred range, the coatable composition comprising the addition polymerizable resin should completely fill the concavities without the need to apply more than hand pressure. However, when the concavities are unusually deep and/or narrow, it may be desirable to reduce the viscosity below about 2,000 cps, because some shrinkage is preferred over any failure to fill the concavities completely.

In order to achieve the desired coatable composition viscosity, it is preferred to employ a reactive or non-reactive (inert) diluent in the coatable composition. Ethylenenically unsaturated monomers such as the alkyl acrylates, or others disclosed in U.S. Pat. No. 4,576,850 (Martens), which is incorporated by reference herein, are suitable reactive diluents. As used herein the term "diluent" connotes a low molecular weight (less than 500) organic material that decreases the viscosity of the composition to which they are added.

Low molecular weight acrylates are one preferred type of reactive diluent. Acrylate reactive diluents preferred for use in the invention typically have a molecular weight ranging from about 100 to about 500, and include ethylene glycol diacrylate, ethylene glycol dimethacrylate, hexanediol diacrylate, triethylene glycol diacrylate, trimethylolpropane triacrylate, glycerol triacrylate, pentaerthyitol triacrylate, pentaerythritol trimethacrylate, pentaerythritol tetraacrylate and pentaerythritol tetramethacrylate. Methyl methacrylate and ethyl methacrylate may also be used.

Other useful reactive diluents include monoallyl, polyallyl, and polymethallyl esters and amides of carboxylic acids (such as diallyl phthalate, diallyl adipate, and N,N-diallyladipamide); tris(2-acryloyl-oxyethyl)isocyanurate, 1,3,5-tri(2-methacryloxyethyl)-s-triazine, acrylamide, methylacrylamide, N-methylacrylamide, N,N-dimethylacrylamide, N-vinylpyrrolidone, and N-vinylpiperidone.

Addition polymerizable resins useful in the practice of the invention are those resins capable of being initiated by exposure to radiation, a photoinitiator, a thermal initiator, or combination of these. Non-particle radiation includes ultraviolet radiation, infrared radiation, and visible light, while the most commonly used and preferred particle radiation used is electron beam irradiation. A combination of particle and non-particle radiation curable resins may be used, but resins which may be initiated by UV or visible light are presently preferred.

Addition polymerizable resins polymerize via a free radical mechanism or an ionic mechanism. Free radicals or ions may be produced by addition of photoinitiators or thermal initiators to the resins. When a photoinitiator alone is used, or when it is exposed to non-particle radiation such as ultraviolet radiation or visible light, the photoinitiator generates a free radical or an ion. This free radical or ion initiates the polymerization of the resin.

Examples of typical and preferred addition polymerizable resins for use in the coatable compositions useful in the invention include: polymers, oligomers, and monomers which are ethylenically unsaturated, such as styrene, divinylbenzene, vinyl toluene, and aminoplast resins having pendant unsaturated carbonyl groups, and the like, (including those having at least 1.1 pendant alpha, beta unsaturated carbonyl group per molecule or oligomer as described in U.S. Pat. No. 4,903,440, which is hereby incorporated by reference); acrylated resins such as isocyanurate resins having at least one pendant acrylate group (such as the triacrylate of tris(hydroxyethyl) isocyanurate), acrylated urethane resins, acrylated epoxy resins, and isocyanate derivatives having at least one pendant acrylate group.

A particularly preferred composition is a one-part, solvent-free, radiation addition-polymerizable, crosslinkable, organic oligomeric composition having hard segments and soft segments plus a photoinitiator present at from 0.1 to 0.5% by weight of the resin, wherein the hard segments are preferably polyurethane and the soft segments are preferably polyester, as disclosed in U.S. Pat. No. 4,576,850 (Martens), previously incorporated by reference herein. A particularly preferred composition formulated in accordance with Martens is given in Example 1, below.

It is to be understood that mixtures of the above resins could also be employed. The term "acrylated" is meant to include monoacrylated, monomethacrylated, multi-acrylated, and multi-methacrylated monomers, oligomers and polymers.

It is noteworthy to mention that monomers which are solids at room temperature may be used if dissolved in a suitable solvent. This is the case with the triacrylate of tris(hydroxyethyl) isocyanurate ("TATHEIC"), one particularly preferred resin, which is a solid at room temperature. When this monomer is used, the "polymerizable resin" for which viscosity reduction is attained includes the solvent, which may or may not be reactive with the monomer, but preferably is reactive with the monomer (and is therefore considered another monomer). One preferred solvent for room temperature solid acrylated monomers is trimethylol propane triacrylate ("TMPTA"); however, solvents such as these are more correctly referred to as reactive diluents when the polymerizable resin is already liquid at room temperature (i.e., about 25° C.). When TATHEIC is used, the combination of TATHEIC/TMPTA is considered as the polymerizable resin. The weight ratio of TATHEIC/TMPTA may range from about 1:2 to about 2:1, more preferably from about 1:1.7 to about 1.7:1, most preferably 1:1.

Acrylated isocyanurate oligomer resins are the presently preferred addition polymerizable resins. Isocyanurate resins useful in the invention include those having at least one pendant acrylate group, which are described in U.S. Pat. No. 4,652,275, incorporated herein by reference. As mentioned previously, one particularly preferred isocyanurate material is TATHEIC dissolved in TMPTA.

Acrylated urethane oligomer resins are preferably acrylate esters of hydroxy-terminated, isocyanate-extended polyester or polyether polyols esterified with low molecular weight (less than about 500) acrylates (such as 2-hydroxyethyl acrylate). The number average molecular weight of preferred acrylated urethane oligomer resins ranges from about 300 to about 10,000, more preferably from about 400 to about 7,000. Examples of commercially available acrylated urethane oligomer resins are those marketed under the trade designations "UVITHANE 782" (available from Morton Thiokol Chemical) and "CMD 6600", "CMD 8400", and "CMD 8805" (available from Radcure Specialties).

Acrylated epoxy oligomer resins are acrylate esters of epoxy resins, such as the diacrylate esters of bisphenol-A epoxy resin. Examples of commercially available acrylated epoxy oligomer resins include those known under the trade designations "CMD 3500", "CMD 3600", and "CMD 3700", also available from Radcure Specialties.

Non-radiation curable urethane resins, epoxy resins, and polymeric isocyanates may also serve as the polymerizable resin in coatable compositions useful in the invention. Urethanes useful in the invention include those disclosed in U.S. Pat. No. 4,933,373, incorporated by reference herein, which are the reaction product of short-chain, active hydrogen functional monomer, such as trimethylolpropane monoallyl ether, ethanol amine, and the like; long-chain, active hydrogen functional diene prepolymer, such as the hydroxy-terminated polybutadiene commercially available from Atochem Inc. under the trade designation "Polybd R-45HT"; a polyisocyanate, and a crosslinking initiator. Suitable crosslinking initiators are organic peroxides, such as benzoyl peroxide, and the like. Urethane catalysts may be used, although not essential, such as those mentioned in U.S. Pat. No. 4,202,957.

Epoxy resins have an oxirane (epoxide) ring and are polymerized by ring opening. Epoxy resins which lack ethylenically unsaturated bonds require the use of photoinitiators. These resins can vary greatly in the nature of their backbones and substituent groups. For example, the backbone may be of any type normally associated with epoxy resins and substituent groups thereon can be any group free of an active hydrogen atom that is reactive (or capable of being made reactive) with an oxirane ring at room temperature. Representative examples of acceptable substituent groups include halogens, ester groups, ether groups, sulfonate groups, siloxane groups, nitro groups and phosphate groups. Examples of preferred epoxy resins lacking ethylenically unsaturated groups include 2,2-bis[4-(2,3-epoxypropoxy)phenyl]propane (diglycidyl ether of bisphenol A) and commercially available materials under the trade designation "Epon 828", "Epon 1004" and "Epon 1001F" available from Shell Chemical Co., "DER-331", "DER-332" and "DER-334" available from the Dow Chemical Co. Other suitable epoxy resins lacking ethylenically unsaturated groups include glycidyl ethers of phenol formaldehyde novolak resins (e.g., "DEN-431" and "DEN-438" available from the Dow Chemical Co.).

Addition polymerizable resins require an initiator, as previously mentioned. Examples of useful initiators that generate a free radical upon exposure to radiation or heat include organic peroxides, azo compounds, quinones, benzophenones, nitroso compounds, acryl halides, hydrozones, mercapto compounds, pyrylium compounds, triacrylimidazoles, bisimidazoles, chloroalkyltriazines, benzoin ethers, benzil ketals, thioxanthones, and acetophenone derivatives, and mixtures thereof. Examples of photoinitiators that when exposed to visible radiation generate a free radical are described in U.S. Pat. No. 4,735,632, incorporated herein by reference. Useful commercially available photoinitiators include those known under the trade designation IRGACURE, from Ciba-Geigy Corp, Ardsley, N.Y. In particular, the photoinitiators known under the trade designations IRGACURE 651 (2,2-dimethoxy-1-2-diphenyl-1-ethanone), IRGACURE 369 (2-benzyl-2-N,N-dimethylamino-1-(4-morpholinophenyl)-1-butanone), and IRGACURE 184 (1-hydroxycyclohexyl acetophenone) are useful in forming the structured surface 18 of the first layer of the inventive articles. The photoinitiator known under the trade designation DAROCUR 1173 (2-hydroxy-2-methyl propiophenone), from EM Industries, is also a useful photoinitiator.

The photoinitiator compound is used in only in the amount necessary to perform its intended function. Generally, the amount of the photoinitiator preferably is about 0.1 to about 1.0, more preferably no more than 0.5% by weight of the resin composition.

Cationic photoinitiators generate an acid source to initiate polymerization of addition polymerizable resins. Cationic photoinitiators can include a salt having an onium cation and a halogen containing complex anion of a metal or metalloid. Other useful cationic photoinitiators include salts of organometallic complex cations and halogen-containing complex anions of a metal or metalloid, which are further described in U.S. Pat. No. 4,751,138, incorporated herein by reference. Still other useful cationic photoinitiators are organometallic salts and onium salts, described in U.S. Pat. No. 4,985,340, and European Patent Applications 306,161 and 306,162, both published Mar. 8, 1989, all incorporated herein by reference. Yet other useful cationic photoinitiators include ionic salts of an organometallic complex in which the metal is selected from the elements of Periodic Group IVB, VB, VIB, VIIB and VIIIB, such salts being described in European Patent Application 109,581 (published May 30, 1984), incorporated herein by reference.

Addition polymerizable resins require an initiator such as a photoinitiator and/or radiation energy. Preferably photoinitiators and radiation energy are used simultaneously. Indeed, addition polymerization rates generally increase with temperature, so that these resins may be simultaneously exposed to a heat source. The total amount of energy required is primarily dependent upon the resin chemistry and secondarily on the thickness and optical density of the coated composition and polymeric film or production tool. For thermal energy, the oven temperature will typically range from about 50° C. to about 250° C. for about 15 minutes to about 16 hours. For free radical addition polymerization in the absence of heating while exposing solely to UV or visible radiation through a plastic film or plastic production tool, in order to fully polymerize all ethylenically unsaturated monomer, the UV or visible energy level should be at least about 100 milliJoules/cm$^2$, more preferably ranging from about 100 to about 700 milliJoules/cm$^2$, using UV radiation of about 350–380 nanometers.

Ultraviolet radiation refers to electromagnetic radiation having a wavelength within the range of about 200 to about 400 nanometers, preferably within the range of about 250 to 400 nanometers. Visible radiation refers to electromagnetic radiation having a wavelength within the range of about 400 to about 800 nanometers, and preferably in the range of about 400 to about 550 nanometers.

Electron beam irradiation, a form of ionizing radiation, can be used at an energy level of about 0.1 to about 10 Mrad, and preferably at an energy level of about 1 to about 10 Mrad, at accelerating potential ranging from about 150 to about 300 kiloelectron volts.

The master or production tooling found suitable for use in the present invention may be prismatic, cube-corner, or the like. For prismatic masters, the pitch may range from about 4 micrometers up to about 0.5 millimeter, more preferably from about 8 micrometers to about 20 micrometers, and the groove depth preferably ranges from about 1 to 20 micrometers, preferably 5 to 12 micrometers. For cube-corner geographies, each minute cube corner element has the shape of a trihedral prism with three exposed planar faces, substantially perpendicular to one another, with the apex of the prism vertically aligned with the center of the base. The angle between the faces is preferably the same for each cube-corner element in the array, and will be about 90 degrees. The cube corner elements are preferably all of the same dimensions and are aligned in an array or pattern of rows and columns, the bases being in the same plane, and adjacent elements being contiguous at the edges of their bases such that there is no spacing or flat areas between adjacent elements. Generally, each cube-corner element has a side edge dimension up to 0.025 inch (0.635 mm), preferably less than 0.010 inch (0.254 mm). The body portion of the first transparent layer 14 (that is, the portion of layer 14 extending from the base of the prism or trihedron to smooth surface 16) will range in thickness from about 0.002 inch to about 0.030 inch (0.05 to 0.075 mm), preferably 0.003 to 0.010 inch (0.075 to 0.25 mm).

B. Adhesive Layer

In all optical security embodiments of the invention, second layer 24 preferably comprises an adhesive layer selected from hot melt thermoplastic adhesives and pressure-sensitive adhesives, although it is within the invention that layer 24 could comprise a laminate of two or more layers in which the layers contacting structured surface 18 and substrate 12 are adhesive in nature, laminates being less preferred due to cost. Adhesive or second layer 24 functions both to adhere first layer 14 to substrate 12, and in conjunction with the separation layer(s) 34 form a logo or other indicia.

In preferred embodiment 1 of FIG. 1, layer 24 is produced as follows. A thermoplastic film, such as polypropylene film, polyethylene film, polyester film, and the like, has applied thereto a separation layer of the desired logo or other indicia. The indicia-bearing film is then heat laminated to structured surface 18. Biaxially oriented polypropylene film is one preferred film useful in this method, in which the film is printed with an acrylic ink, such as the acrylic ink known under the trade designation RAGE-800, available from Advance Process Supply of Chicago, Ill. A useful printing process is the screen printing process, such as described in U.S. Pat. No. 5,011,707, incorporated herein by reference. In the heat lamination process, an adhesive having a melting temperature lower than the ink is used to laminate the logo-printed film to the structured surface, using, for example, a laminator heated to about 140° C. The composite is then cooled to allow the film to be removed, after which the composite is reheated to melt the adhesive and laminate the security article to a substrate.

Figure 3:
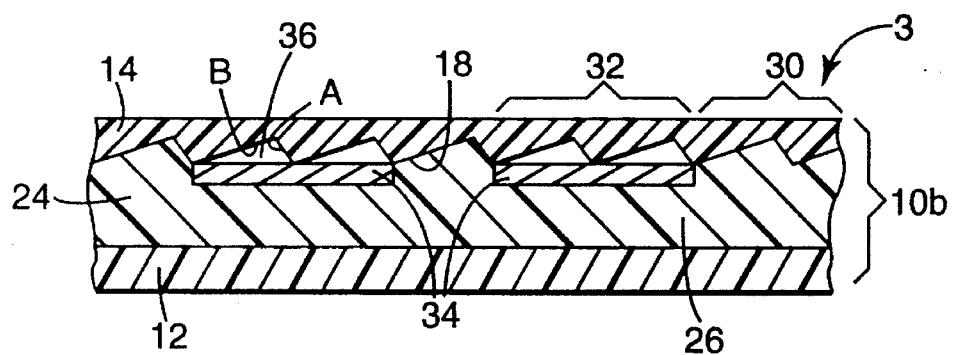

In embodiments 2 and 3 of FIGS. 2 and 3, respectively, adhesive layer 24 is either a pressure-sensitive or hot melt thermoplastic adhesive, which has been applied as a continuous layer to a plastic film such as those mentioned above. In these embodiments, the separation layer is printed directly onto the adhesive layer. If a hot melt adhesive is employed, it is simply extrusion coated onto a film such as by the method described in U.S. Pat. No. 4,977,003, incorporated by reference herein. The image-bearing hot melt adhesive layer is then heat laminated to the structured surface as in embodiment 1. If a pressure-sensitive adhesive (PSA) is employed, it is preferably an acrylic PSA, typically coated from solution onto the plastic film. In either case, the film is removed after adhering to the structured surface, exposing the adhesive layer, which is then laminated or pressed onto the substrate to be overlaid.

A hot melt adhesive is preferred where a permanent bond is required. The process is also probably more easily made into a continuous production process when a hot melt adhesive is employed. A disadvantage of the use of hot melt adhesives is that heat lamination equipment is required. PSAs afford the processor the opportunity to select the peel adhesion desired, from temporary, as with adhesives known under the trade designation "POST-IT", or permanent. Also, heat lamination equipment is not required when using PSAs. However, the coating of a PSA may evolve solvent vapors.

Suitable hot melt adhesives for use in the invention include polyolefin and alkylene copolymer-based hot melt adhesives, described in Chapter 23, and polyester and polyamide high performance hot melt adhesives, described in Chapter 28, both chapters appearing in the Handbook of Adhesives, Third Edition, Van Nostrand Reinhold (1990), which are incorporated herein by reference. The useful polyolefin hot melt adhesives are primarily ethylene-vinyl acetate (EVA) copolymers ranging from about 18 to about 40 mole percent vinyl acetate, and may be produced in a wide range of compositions and melt indices. A lower melt index indicates an increase in molecular weight and generally improves heat seal strength, flexibility, hot tack, and cohesive strength. A high melt index improves low temperature performance and decreases melt viscosity. Other than EVA polymers, atactic polypropylene (APP), low density polyethylene (LDPE), and low molecular weight polyethylene (LMWPE) may be used, although APP is tacky as produced and is not easily formulated. Polyolefin homopolymers, such as LDPE, are desirable if they have high molecular weight.

Polyamide polymers useful in preparation of hot melt adhesives include those produced using the following monomers: dibasic acids such as dimer acid (dimerized fatty acids), dodecanoic acid, sebacic acid, azelaic acid, and adipic acid; amino acids, such as 11-aminoundecanoic acid; lactams such as caprolactam and dodecalactam; and diamines such as ethylene diamine, hexamethylene diamine, diethylene diamine, triethylene diamine, piperazine, dipiperidyl propane, and polyoxypropylene diamine. From these monomers, two general classes of polyamides useful in hot melt adhesives may be characterized as: polyamides from long chain, vegetable oil-derived acids and short chain diamines; and polyamide copolymers and terpolymers of short chain monomers. Of the latter, hot melt polyamide films are obtained by extruding terpolymers such as nylon 6, 6-6, and 12 or nylon 6, 6-9, and 6-12 on release paper. Manufacturers of polyamides include Rilsan Corp., Bostik Fastening Systems Group, and Emser-Werke.

Polyester polymers useful in preparation of hot melt adhesives are generally polymers of more than one acid or ester and one or more glycols. Suitable acids include those mentioned above in the production of polyamide polymers, plus terephthalic and isophthalic acids; dialkyl esters such as dimethyl terephthalate, dimethyl adipatye, dimethyl azelate, and the like; and suitable glycols include ethylene glycol, 1,4-butanediol, 1,6-hexanediol, 1,4-cyclohexane dimethanol.

In formulating hot melt adhesives useful in the invention, the composition typically comprises three components: about 20 to 80 weight percent of a polymer; about 20 to 60 percent of a tackifier, and about 10 to 30 percent of a wax, with minor amounts of other ingredients, such as UV stabilizers and antioxidants.

Tackifiers are commonly added in hot melt adhesive formulations to increase the adhesion of the polymer to various substrates. This is due to the increased wetting of the substrate due to lower viscosity of the composition. Many tackifiers are commercially available and useful in the invention, but they may generally be categorized as hydrocarbon resins (particularly the $C_5$ aliphatic resins comprised largely of olefins, diolefins, and isoprene monomers), rosin esters and polyterpenes.

The rosin-based tackifiers are useful because they tend to be compatible with a wide range of adhesive components. Natural rosins have as their main constituent abietic acid, which contains a conjugated double bond, thus making them subject to degradation by UV, oxygen, and heat. The natural rosins must be modified by hydrogenation, disproportionation, or dimerization followed by esterification with glycerol or pentaerythritol.

Terpene-based tackifiers may be derived from terpentine sulfate and limonene. Examples include alpha-pinene, beta-pinene, and dipentene. The alpha-pinenes are more compatible than the other terpenes with EVA copolymers and are thus preferred tackifiers with EVA copolymers. Tackifiers which are optically clear are preferred for use in the present invention, such as styrene/isobutylene resins containing a saturated polymer backbone, available from Lawter International, and Amoco's alpha-methylstyrene and polybutenes.

Waxes are preferably included in useful hot melt adhesives at a weight percentage ranging from about 20–30 percent to lower cost and reduce viscosity, although the trend is for reduced amount of wax in these adhesives. This is due to the lower amount of microcrystalline waxes produced by crude oil refiners, and by the efforts of polymer manufacturers to modify their products to afford the polymer with properties normally supplied by the wax. Wax content primarily increase the softening point and cohesive strength of the hot melt formulation. Microcrystalline waxes (m.p. about 90 C.), synthetic waxes (m.p. about 100–120 C.), and higher melting paraffin waxes (m.p. about 65–70 C.) are often used, the former two for their high temperature properties and greater cohesive strength, the paraffin waxes for their barrier and heat seal properties.

As a typical example, one useful hot melt adhesive composition comprises 30 percent of the EVA copolymer known under the trade designation ELVAX 220 (du Pont), 50 percent of a polyterpene resin, 20 percent of a microcrystalline wax, and a small amount of an antioxidant, all percentages based on weight.

Hot melt adhesives may be applied to plastic films using equipment known in the industry, such as slot die coaters, roll coaters, pattern coaters, spray applicators, and foam applicators.

A wide variety of PSAs may be used in articles of the present invention. PSAs having 180° peel adhesion ranging from about 170 to about 1000 gm/cm, more preferably ranging from about 390 to about 560 gm/cm, are all useful PSAs, the 180° peel adhesion measured using a standard test procedure such as follows. A standard glass plate (10.2 cm×30.5 cm) is cleaned using one wash of diacetone alcohol followed by three washes of n-heptane. With very light tension, a sample (2.5 cm×40 cm) having a PSA-backsize coating is then applied along the center of the standard glass plate, PSA side down. The sample is then rolled once with a 2.04 Kg hand roller. The standard glass plate is then secured to a horizontal platen in a standard peel adhesion tester known under the trade name "IMASS." One end of the sample is then attached to a hook which was a part of the peel adhesion tester. The sample is peeled from the standard glass plate at a 180° angle (i.e., one end of the sample was pulled toward the other end) by moving the platen horizontally at a speed of 228.6 cm/min (90 in/min), and the force required recorded, in gm/cm of sample width, for various dwell times.

The internal cohesive strength (shear strength) is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load. Internal cohesive strength (shear strength) of useful PSAs for the present invention can range from about 1 minute to over 10,000 minutes.

Shear strength tests are typically conducted on adhesive coated strips applied to a stainless steel panel such that a 12.5 mm by 12.5 mm portion of each strip is in firm contact with the panel with one end portion of the tape being free. The panel with coated strip attached is held in a rack such that the panel forms an angle of 178° with the extended tape free end which is then tensioned by application of a force of one kilogram applied as a hanging weight from the free end of the coated strip. The 2° less than 180° is used to negate any peel forces thus insuring a more accurate determination of the holding power of the tape being tested. The time elapsed for each tape example to separate from the test panel is recorded as the shear strength.

PSAs useful in the structures of the present invention are known in the art and are compositions which may include one or more of latex crepe, rosin, isobutylene polymers, cumarone resins, acrylic-based copolymers, vinyl ethers, alkyd adhesives, rubber adhesives based on rubbers such as natural rubber, synthetic rubbers, and chlorinated rubbers, polyisobutylene, polyvinyl isopropylene, polybutylacrylate, polyvinyl n-butyl ether, and polyacrylate esters and mixtures thereof. The presently preferred PSAs, because of their extended shelf life and resistance to detackifying under atmospheric conditions, are acrylic-based copolymer adhesives as disclosed in U.S. Pat. No. Re 24,906. One example of such an acrylic-based copolymer is a 95.5:4.5 (measured in parts by weight of each) isooctylacrylate/acrylic acid copolymer. Other preferred adhesives are a 68:26:6 terpolymer of ethyl acrylate, butyl acrylate, and acrylic acid; a 96:4 copolymer of isooctylacrylate and acrylamide; and a 56:40:4 terpolymer of isooctylacrylate, vinylacetate, and acrylic acid. Such acrylic PSAs can be coated on the back side of sheet-like segments of coated abrasive out of a solution of heptane: isopropanol solvent and the heptane: isopropanol solvent subsequently evaporated, leaving a pressure-sensitive adhesive coating.

C. Separation Layer

The separation layer(s) must be comprised of a material which can retain its integrity while the inventive optical composite is being produced, and also must perform its function in the finished composite of separating the second portion of the concavities of structured surface 18 from the second layer 24 in the reflective area or areas 32 of the inventive optical security articles. In preferred embodiments, the separation layer comprises an imaging material. In addition, the imaging material is preferably selectively applied so that some or all of the information can be in the form of so-called "flip-flop" images that are viewable only across a narrow range of angles and change color across that range of angles. Such images can be viewable in ambient light, thus affording a readily apparent verification of the authenticity of the document. A "flip-flop" image can afford a second level of authenticity, by becoming bright when viewed retroreflectively, thus making it especially difficult either to tamper with the document or to counterfeit the novel overlay. When optical security articles of the invention are used as transparent protective overlays for authenticated substrates such as identification cards, the imaging material is preferably colorless so that the imaging material does not totally mask the underlying substrate in the reflective areas 32 of the article.

In response to air-pollution regulations, preferred imaging materials are those which are formulated to harden (dry) upon exposure to radiant energy: UV, electron-beam, and infrared radiation. Lithographic and letterpress inks are now available for web-fed and sheet-fed printing presses that will cure-dry instantly when exposed to radiators of the required intensity.

Preferred imaging materials for use in the present invention as separation layers are acrylic inks, which comprise a reactive (monomeric or oligomeric) acrylate vehicle, and a photoinitiator. One preferred acrylic ink is that known under the trade designation RAGE-800, available from Advance Process Supply, Chicago, Ill., which hardens to a colorless image.

Although the optical security articles of the first and second embodiments illustrated in FIGS. 1 and 2 can be effectively used as transparent protective overlays, separation layers 34 typically substantially mask areas of the substrate 12 underlying the separation layer. This tends to substantially prevent viewing of the substrate from angles which are substantially perpendicular to smooth surface 16 of first layer 14. Depending upon the nature of substrate 12, this masking may be undesirable.

In a third preferred embodiment 3 (FIG. 3), an "off-axis" article 10b is provided. Article embodiment 10b is similar to the optical security articles 10 and 10a described above except the linear prisms of structured surface 18 are asymmetrical. The optical security article 10b of embodiment 3 differs from the optical security articles of embodiments 1 and 2, respectively, in terms of performance by shifting the angle at which masking of substrate 12 occurs. Typically, masking of substrate 12 when using optical security article 10b occurs at angles which are not substantially perpendicular to smooth surface 16 of first layer 14. The angle at which masking occurs depends on the relative dimensions of facets A and B of the prisms, as depicted in FIG. 3, which in turn are determined by the pitch and groove depth selected.

D. Other Embodiments

Other embodiments of optical security articles of the invention are possible. A fourth embodiment is wherein the first layer 14 comprises a plastic film having a diffraction grating as structured surface 18. A fifth embodiment is wherein layer 14 comprises a substantially totally internal reflecting film in some portion, and second portion is a diffraction grating. If a diffraction grating is employed, an optical security article is formed having holographic properties without requiring equipment for producing holographs. The diffraction gratings provide decorative aspects, in that incident white light is separated into seven component wavelengths, thus producing a "rainbow" effect.

II. Methods of Making the Inventive Optical Security Articles

Methods of making articles of the invention are now described.

Many methods may be employed to produce a transparent plastic layer having plural geometric concavities, including use of ruling engines (particularly for producing diffraction gratings); batch cast and cure methods such as described in assignee's U.S. Pat. No. 5,183,597; continuous cast and cure processes; and embossing methods such as those described in assignee's U.S. Pat. No. 4,895,428, all incorporated by reference herein. Of these, the most preferred are the batch cast and cure methods when first layer 14 is relatively thin and high production speeds are not a concern, and continuous cast and cure processes where production speed is desired.

Figure 4:
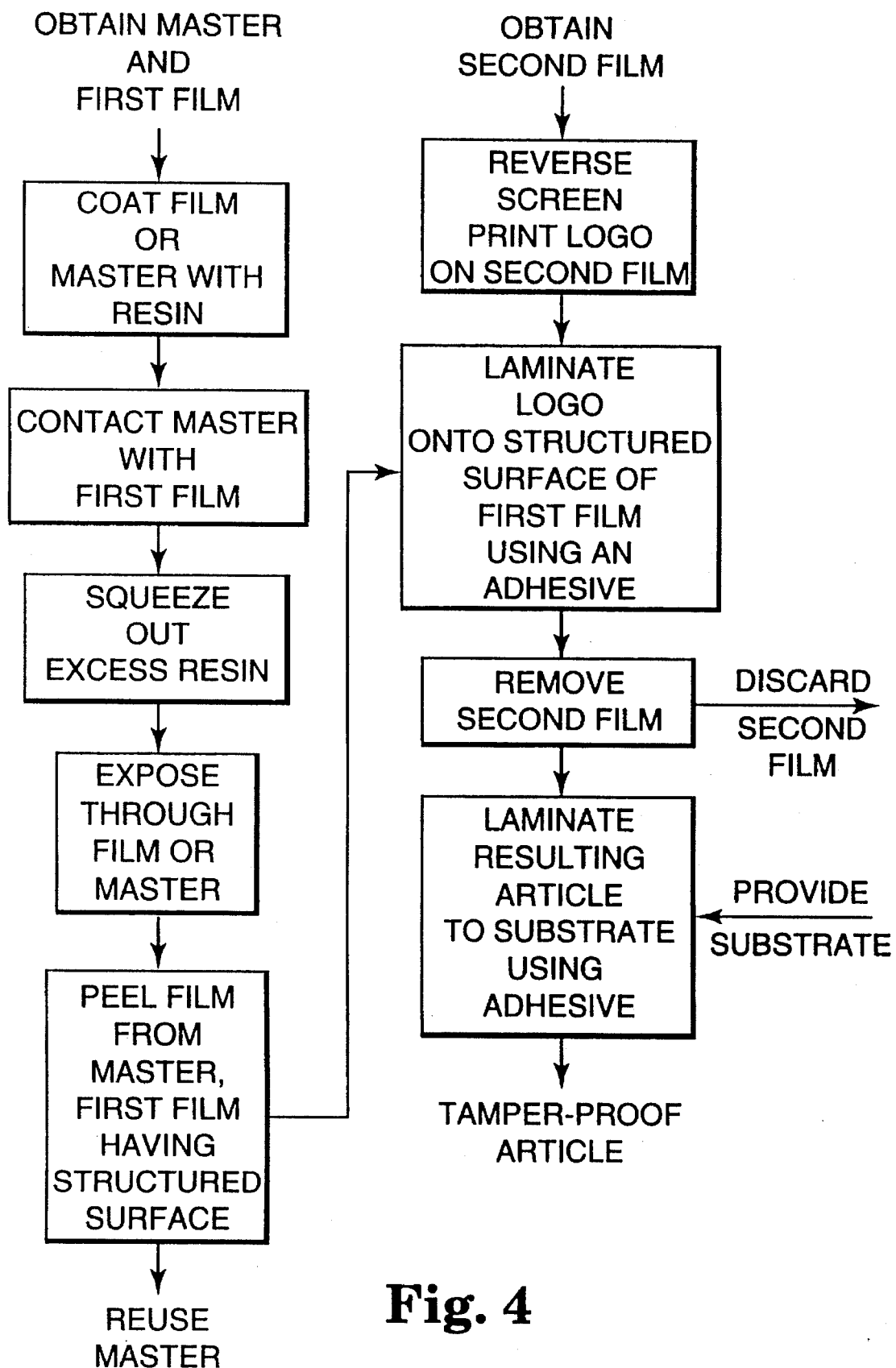
FIGS. 4 and 5 are schematic process flow diagrams of the methods of making the inventive articles.
Figure 5:
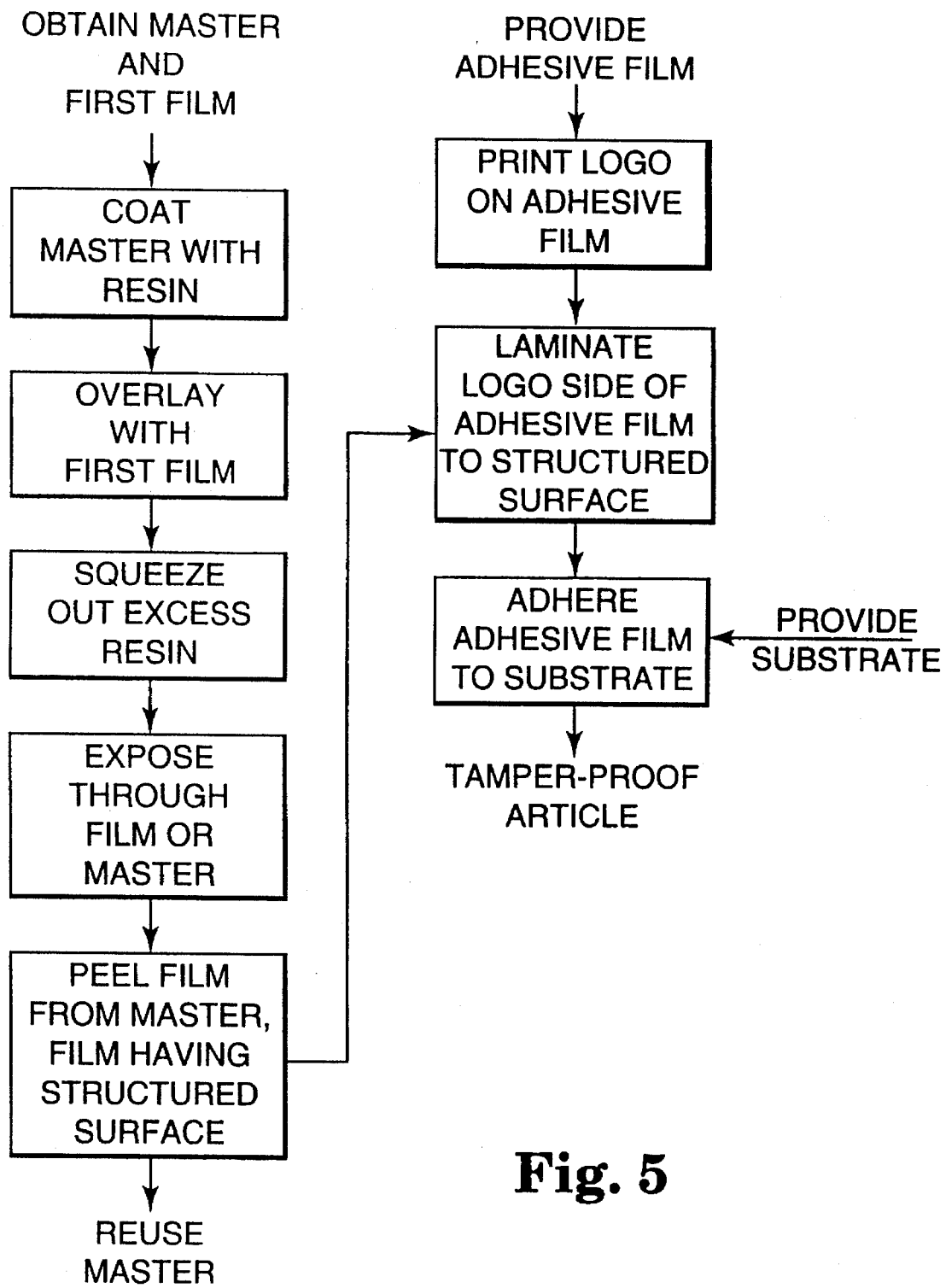

The four inventive methods discussed previously may be represented schematically in FIGS. 4 and 5, where FIG. 4 illustrates a process flow diagram for inventive methods 1 and 2, and FIG. 5 illustrates a process flow diagram for inventive methods 3 and 4. One first obtains a master, as described in the Martens patent. An essential step for all of the inventive processes is to prepare the coatable composition. The coatable composition is made by combining together by any suitable mixing technique the selected free radical addition-polymerizable resin, the photoinitiator system and the optional additives, including any diluents. Examples of mixing techniques include low shear and high shear mixing, with high shear mixing being preferred. Ultrasonic energy may also be utilized in combination with the mixing step to lower the composition viscosity. The amount of air bubbles in the slurry can be minimized by pulling a vacuum during the mixing and/or coating steps (or between the mixing and coating steps). In some instances it is preferred to heat, generally in the range of 30° to 70° C., the composition to lower the viscosity. It is important the composition have rheological properties that allow it to coat well.

The composition is coated on either the front surface of a backing or onto a production tool (master). This coating can be accomplished by any conventional technique such as roll coating, gravure coating, knife coating, spray coating, transfer coating, vacuum die coating, die coating and the like.

Alter the composition is coated onto the backing or master, the composition is sandwiched between the master and the backing and the composition is exposed to a radiation source producing radiation in at least some portion of the UV and/or visible spectrum, and other optional energy sources, depending on the resins and photoinitiators used, to initiate polymerization, cure the binder precursors and form the shaped plastic article. The resulting article is peeled from the master and is generally ready for use.

The production tool or master contains a plurality of concavities. These concavities are essentially the inverse shape of the structured surface 18 and are responsible for generating the shape of the structured surface. The dimensions of the concavities are selected to provide the desired shape and dimensions of the structured surface 18. If the shape or dimensions of the master concavities are not properly fabricated, the resulting master will not provide the desired dimensions for the geometric concavities of structured surface 18.

The concavities can be present in a dot-like pattern with spaces between adjacent concavities or the concavities can butt up against one another. It is preferred that the concavities butt up against one another. Additionally, the shape of the concavities is preferably selected such that the cross-sectional area of the structured surface decreases away from the backing.

The production tool can be a belt, a sheet, a continuous sheet or web, a coating roll such as a rotogravure roll, a sleeve mounted on a coating roll, or die. The production tool can be composed of metal, (e.g., nickel), metal alloys, or plastic. The metal production tool can be fabricated by any conventional technique such as engraving, hobbing, electroforming, diamond turning, and the like. One preferred technique for a metal production tool is diamond turning.

A thermoplastic production tool in sheet form can be replicated off a metal master tool. The master tool will have the inverse pattern desired for the thermoplastic production tool. The master tool is preferably made out of metal, e.g., copper which is electroplated onto a plastic master, the latter produced by diamond turning. The thermoplastic sheet material can be heated and optionally along with the master tool such that the thermoplastic material is embossed with the master tool pattern by pressing the two together. The thermoplastic material can also be extruded or cast onto the master tool. In both cases, the thermoplastic material is cooled below its melt flow temperature to produce the production tool. Examples of preferred thermoplastic production tool materials include polyester, polycarbonate, polyvinyl chloride, polypropylene, polyethylene and combinations thereof. If a thermoplastic production tool is utilized, then care must be taken not to generate excessive heat that may distort the tool.

The production tool may also contain a release coating to permit easier release of the structured surface 1 g from the production tool. Examples of such release coatings for metal production tools include hard carbide, nitrides or borides coatings. Examples of release coatings for thermoplastics include silicones and fluorochemicals, either grained onto, or impregnated into the thermoplastic, or overlaid onto the thermoplastic.

One preferred method of making a first layer 14 such as illustrated in FIGS. 1–3 is to first coat a coatable composition onto at least one side of a backing, applied using one of the previously mentioned suitable techniques. One preferred backing is a polymeric film, such as polyester film that contains an ethylene acrylic acid copolymer primer. Second, the coated backing is contacted with the outer surface of a patterned production tool. The composition wets the patterned surface to form an intermediate article. Third, the composition is exposed to radiation in at least some portion of the UV and/or visible spectrum, and other optional energy sources, as previously described, which at least partially cures or gels the resin in the composition before the intermediate article is removed from the outer surface of the production tool. Fourth, the intermediate article is removed from the production tool. The four steps are preferably carried out continuously.

Figure 6:
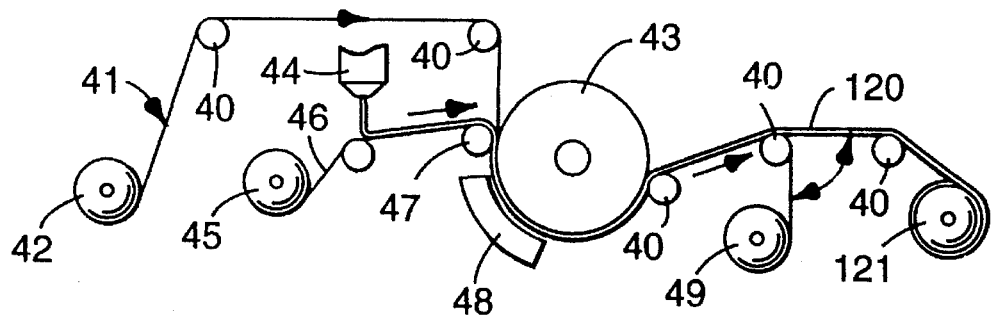
FIGS. 6–7 are schematic diagrams of two useful methods of making the inventive articles.
Figure 7:
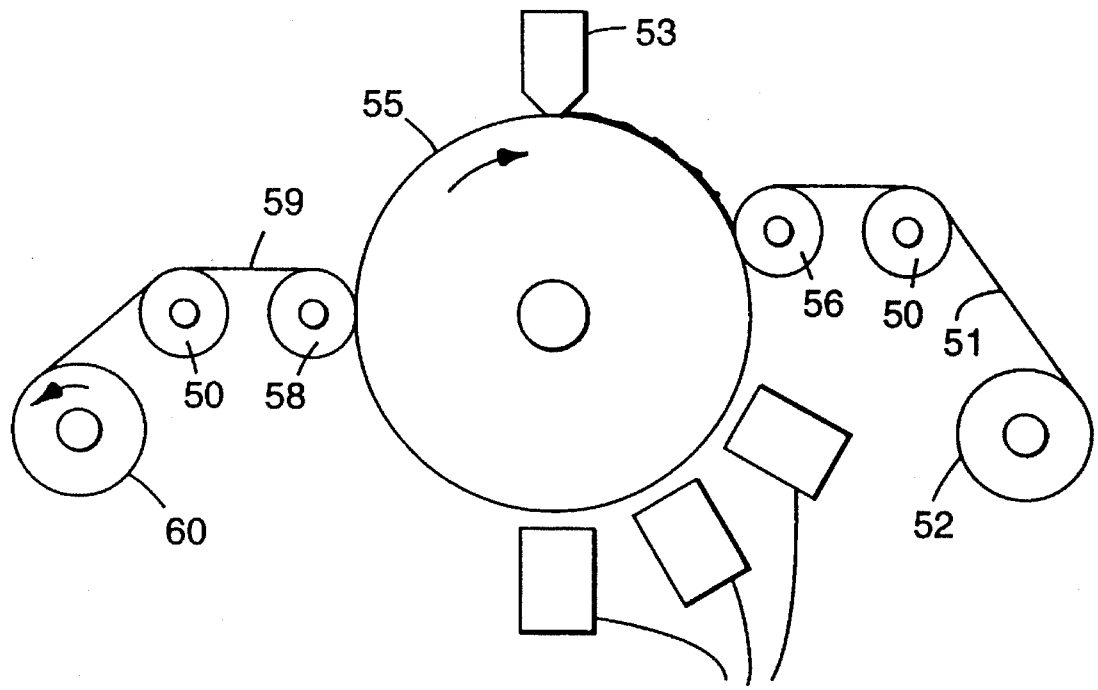

Alternatively, the composition may be first applied to the production tool in the methods illustrated in FIGS. 6 and 7. In FIG. 6, backing 41 leaves an unwind station 42 and at the same time the production tool 46 leaves an unwind station 45. Production tool 46 is coated with composition by means of coating station 44. It is possible to heat the composition and/or subject the composition to ultrasonics prior to coating to lower the viscosity. The coating station can be any conventional coating means such as knife coater, curtain coater, die coater, drop die coater, or vacuum die coater. During coating the formation of air bubbles should be minimized. The preferred coating technique is a vacuum fluid bearing die, such as disclosed in U.S. Pat. Nos. 3,594,865, 4,959,265, and 5,077,870, all incorporated herein by reference. After the production tool is coated, the backing and the composition are brought into contact by any means such that the composition wets the front surface of the backing. In FIG. 6, the composition is brought into contact with a "front" surface of the backing by means of a contact nip roll 47. Contact nip roll 47 forces the resulting construction against support drum 43. A source of energy 48 providing radiation in at least some portion of the UV and/or visible spectrum, and other optional energy sources, transmits a sufficient amount of energy into the composition to at least partially cure the addition-polymerizable resin in the composition. The term "partial cure" means that the resin precursors are polymerized to such a state that the cured composition releases from the production tool. The partially cured resin can be more completely cured, once it is removed from the production tool, by an appropriate energy source. Following this, the production tool is rewound on mandrel 49 so that the production tool can be reused. Additionally, article 120 is wound on mandrel 121.

Alternatively the coatable compositions can be coated onto the backing and not into the concavities of the production tool. The composition coated backing is then brought into contact with the production tool such that the composition flows into the concavities of the production tool. The remaining steps to make the article are the same as detailed above.

Another method is illustrated in FIG. 7. Backing 51 leaves an unwind station 52 and the coatable composition 54 is coated into the concavities of the production tool 55 by means of the coating station 53. The coatable composition can be coated onto the tool by any one of many techniques previously mentioned. Again, it is possible to heat the coatable composition and/or subject the coatable composition to ultrasonics prior to coating to lower the viscosity. During coating the formation of air bubbles should be minimized. Then, the backing and the production tool containing the coatable composition are brought into contact by a nip roll 56 such that the composition wets the front surface of the backing. Next, the addition-polymerizable resin in the coatable composition is at least partially cured by exposure to an energy source 57 providing radiation in at least some portion of the UV and/or visible spectrum, and other optional energy sources. After this at least partial cure, the coatable composition is converted to a composite 59 that is bonded or adhered to the backing. The resulting article is removed from the production tool by means of nip rolls 58 and wound onto a rewind station 60. In this method the preferred backing is a transparent polyester film.

Regarding this latter method, the coatable composition may alternatively be coated directly onto the front surface of the backing. The coatable composition coated backing is then brought into contact with the production tool such that the coatable composition wets into the concavities of the production tool. The remaining steps to make the abrasive article are the same as detailed above.

The radiation energy can be transmitted through the production tool so long as the production tool does not appreciably absorb the radiation energy. Additionally, the radiation energy source should not appreciably degrade the production tool.

Once layer 14 is produced, the method of adhering the structured layer 14 to the separation layers 34 must be selected. If a hot melt thermoplastic adhesive is to be employed, the separation layer material may be printed onto a thermoplastic film and the thermoplastic film heat-laminated in known fashion to layer 14, thus forming an article of the invention such as illustrated in FIGS. 2 and 3. Of course, one skilled in the art chooses the composition of layers 14 and 24 keeping in mind that the optical properties of layer 14 must be intact in reflective areas 32 after the heat lamination. If an EVA hot melt adhesive is selected, the separation areas may be applied via printing or other means to a plastic film to form an intermediate, and the intermediate brought into contact with layer 14 in the presence of the molten EVA. The plastic film may then be peeled away, revealing the EVA.

EXAMPLES

The invention will be further explained by the following illustrative examples which are intended to be nonlimiting. Unless otherwise indicated, all amounts are expressed in parts by weight.

Example 1

Four different transparent first layers having a smooth surface and a structured surface, and optical security articles incorporating same, were made using the following procedure. A first structured surface film (film 1) was prepared using a standard prismatic tooling having groove depth of 0.007 inch (0.178 mm) and pitch of 0.014 inch (0.356 mm), and three other structured surface films 2, 3, and 4 were produced using symmetric prismatic tools (4, 8, and 16 micrometer pitch). The structured surfaces were replicated from a nickel master onto a 0.005 inch (0.127 mm) thick film known under the trade designation DSCT-PET from Douglas Hanson Co. using the following procedure.

A resin composition was prepared having a viscosity of 1600 cps and consisted of 54.3 parts acrylate-capped polycaprolactone urethane oligomer; 16.3 parts N-vinyl pyrrolidone; 11.3 parts [(ethoxy)-2-ethoxy]ethyl acrylate; 5.7 parts 1,6-hexanediol diacrylate; 11.1 parts N-(isobutoxy methyl)acrylamide; 1.0 part tertiary amine mixture (known under the trade designation TINUVIN 292 from Ciba-Geigy, Ardsley, N.Y.); and 0.25 part 1-hydroxy cyclohexyl acetophenone.

The nickel master was coated in each case with the liquid resin and overlaid with the PET film to facilitate curing. The excess resin was squeezed out by using a rubber roller. The tool and resin were illuminated through the clear PET backing using 2 passes of a medium pressure mercury lamp, providing an exposure of 110 mJ/cm$^2$ of 350–380 nanometer light. The UV cured replica was peeled from the master, typically showing excellent retroreflection when viewed perpendicular to the smooth surface of the film.

A logo was reverse screen printed on a biaxially oriented polypropylene (BOPP) film using a colorless acrylic ink known under the trade designation RAGE-800 from Advance Process Supply of Chicago. The resultant logo was adhered to the prismatic structured surface in each case using a desk-top laminator heated to 149° C., using an EVA hot melt adhesive. The BOPP film was removed and the adhesive layer placed against and adhered to a photographic substrate known under the trade designation DURAFLEX using the desk-top laminator.

The first structured surface (film 1) was too coarse, making it difficult for the adhesive to adequately fill the grooves, limiting the logo fidelity and resolution. However, the image formed was very visible. Films 2, 3, and 4 provided a better mix of logo brightness and resolution. The smallest, 4 micrometer pattern of film 2 was not reflective, likely a diffractive effect, and the logo image suffered. The 8- and 16- micrometer pitch films provided a good image. Of the two, the 8 micrometer film appeared to be an optimum as the smaller pitch allowed better resolution.

Example 2

Based on the results of Example 1, two nickel production tools were fabricated having prismatic patterns oriented to shift the logo off-axis, as illustrated in FIG. 3. Groove pitches of 8 and 16 micrometers were chosen to be consistent with the optimum identified above. The groove depths were 5.6 and 11.2 micrometers, respectively. While the image of the logo was moved off-axis as desired in each case, the image visibility and its ability to completely cover the underlying document was reduced for both samples. As shown in FIG. 3, this occurs as the tilted prisms do not allow 100% of surface 18 to be optically reflective.

Various modifications and alterations of this invention will become apparent to those skilled in the art without departing from the scope of the appended claims.

What is claimed is:

1. An optical security article comprising:
   (a) a first layer substantially transparent to visible light and having a first refractive index, the first layer having a structured first surface comprising a plurality of adjacent geometric concavities and peaks and a substantially planar second surface;
   (b) an adhesive layer coterminating with said first layer, the adhesive layer substantially filling and adhesively contacting a first number of the geometric concavities, the adhesive layer having a refractive index which is substantially equal to the refractive index of the first layer, thus forming at least one transparent area, and
   (c) a separation layer disposed between the adhesive layer and a second number of the geometric concavities to prevent contact of the adhesive with the concavities and to define a plurality of pockets between the separation layer and the second number of concavities.

2. An article in accordance with claim 1 wherein said separation layer is discontinuous, and the discontinuous portions of the separation layer have substantially the same refractive index.

3. An article in accordance with claim 1 wherein the separation layer comprises an imaged material.

4. An article in accordance with claim 1 wherein the refractive index of the first layer is $RI_1$ and the refractive index of the adhesive layer is $RI_2$, and wherein $RI_1$ and $RI_2$ are related by a ratio $RI_1:RI_2$ ranging from about 0.9:1.0 to about 1.1:1.0.

5. An article in accordance with claim 1 wherein said adhesive layer comprises a hot melt thermoplastic adhesive.

6. An article in accordance with claim 5 wherein a surface of said adhesive layer opposite the plurality of geometric concavities has a second layer removably adhered thereto.

7. An article in accordance with claim 1 wherein said adhesive layer comprises a pressure-sensitive adhesive.

8. An article in accordance with claim 7 wherein a surface of said adhesive layer opposite the plurality of geometric concavities has a second layer removably adhered thereto.

9. An article in accordance with claim 1 wherein said plurality of geometric concavities is defined by a series of parallel linear prisms having planar facets.

10. An article in accordance with claim 9 wherein said linear prisms are asymmetrical.

11. An article in accordance with claim 1 wherein said first layer comprises a film which is totally internal reflecting in the absence of contact between said first layer and said adhesive layer.

12. An article in accordance with claim 1 wherein said first layer comprises a diffraction grating.

13. An article in accordance with claim 1 wherein said pockets are air pockets.

14. An article in accordance with claim 1 wherein the separation layer contacts only the peaks of the structured first surface.

15. A tamper-proof article comprising the optical security article of claim 1 adhered by said adhesive layer to a substrate.

16. The optical security article of claim 1, wherein said structured first surface is a microstructured surface.

* * * * *